United States Patent
Wang et al.

(10) Patent No.: US 9,733,518 B2
(45) Date of Patent: Aug. 15, 2017

(54) LIQUID CRYSTAL DISPLAY COMPRISING DIFFERENT MIXED LIQUID CRYSTAL MATERIALS RESPECTIVELY LOCATED IN A PLURALITY OF RED, GREEN, AND BLUE STRIP GROOVES

(71) Applicant: Shenzhen China Star Optoelectronics Technology Co., Ltd., Shenzhen (CN)

(72) Inventors: Yanan Wang, Shenzhen (CN); Xiaolong Ma, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 144 days.

(21) Appl. No.: 14/786,553

(22) PCT Filed: Oct. 12, 2015

(86) PCT No.: PCT/CN2015/091714
§ 371 (c)(1),
(2) Date: Oct. 23, 2015

(87) PCT Pub. No.: WO2017/045236
PCT Pub. Date: Mar. 23, 2017

(65) Prior Publication Data
US 2017/0153502 A1     Jun. 1, 2017

(51) Int. Cl.
G02F 1/1335     (2006.01)
G02F 1/1368     (2006.01)
(Continued)

(52) U.S. Cl.
CPC ........ G02F 1/133617 (2013.01); G02F 1/137 (2013.01); G02F 1/1337 (2013.01);
(Continued)

(58) Field of Classification Search
CPC ............... G02F 1/137; G02F 1/133621; G02F 2203/05; G02F 2001/133614;
(Continued)

(56) References Cited

U.S. PATENT DOCUMENTS

2005/0062903 A1*   3/2005   Cok ........................ B82Y 10/00
    349/69
2009/0153942 A1*   6/2009   Daniel .................... G02F 1/167
    359/296
(Continued)

*Primary Examiner* — Paul Lee
(74) *Attorney, Agent, or Firm* — Leong C. Lei (57) ABSTRACT

The present invention provides a liquid crystal display device. By mixing the quantum dots of different light emitting wavelengths in the liquid crystals to replace the color resist layer on the CF substrate, the liquid crystal display panel still can emit lights of RGB three colors in condition of without the color resist layer. Meanwhile, by mixing the dichroic dye with polarization function in the liquid crystals, the arrangement of one polarizer can be eliminated. In comparison with the traditional liquid crystal display panel, the liquid crystal display panel of the present invention eliminates the components, such as the color resist layer and the upper polarizer. The structure is simple, and the manufacture cost is low. Meanwhile, the color display quality of the liquid crystal display panel is great, and the light transmission ratio is high, which effectively promote the light use efficiency and the display performance of the liquid crystal display device.

18 Claims, 8 Drawing Sheets

(51) Int. Cl.
*G02F 1/1343* (2006.01)
*G02F 1/1337* (2006.01)
*G02F 1/137* (2006.01)

(52) U.S. Cl.
CPC ...... *G02F 1/1368* (2013.01); *G02F 1/133512* (2013.01); *G02F 1/133528* (2013.01); *G02F 1/133621* (2013.01); *G02F 1/134309* (2013.01); *G02F 1/134363* (2013.01); *G02F 1/133514* (2013.01); *G02F 2001/133531* (2013.01); *G02F 2001/133614* (2013.01); *G02F 2001/133742* (2013.01); *G02F 2001/134372* (2013.01); *G02F 2201/121* (2013.01); *G02F 2201/123* (2013.01); *G02F 2202/36* (2013.01); *G02F 2203/05* (2013.01)

(58) Field of Classification Search
CPC ..... G02F 2202/36; G02F 2001/133742; G02F 1/133524; G02F 1/133617; G02F 2203/01; G02F 2001/133531
See application file for complete search history.

(56) References Cited

U.S. PATENT DOCUMENTS

| | | | |
|---|---|---|---|
| 2010/0208172 A1* | 8/2010 | Jang | B82Y 20/00 349/71 |
| 2011/0261303 A1* | 10/2011 | Jang | G02F 1/13318 349/108 |
| 2013/0120678 A1* | 5/2013 | Chao | G02F 1/01 349/34 |
| 2013/0120688 A1* | 5/2013 | Chao | F21V 11/00 349/62 |
| 2013/0182313 A1* | 7/2013 | Gibson | G02F 1/167 359/296 |

* cited by examiner

LIQUID CRYSTAL DISPLAY COMPRISING DIFFERENT MIXED LIQUID CRYSTAL MATERIALS RESPECTIVELY LOCATED IN A PLURALITY OF RED, GREEN, AND BLUE STRIP GROOVES

FIELD OF THE INVENTION

The present invention relates to a display technology field, and more particularly to a liquid crystal display device.

BACKGROUND OF THE INVENTION

The LCD (Liquid Crystal Display) possesses advantages of thin body, power saving and no radiation to be widely used in many application scope. Most of the liquid crystal displays on the present market are back light type liquid crystal display devices, which comprise a liquid crystal display panel and a back light module. The backlight module provides light sources for the liquid crystal display panel. The liquid crystal display panel controls the throughput of the light in advance with signal driving. With the color resists, the light passing through is filtered to be red, green, blue, three primary colors. With the adjustment and match for the light intensities of the three primary colors, the display of different brightness and colors are realized.

Figure 1:
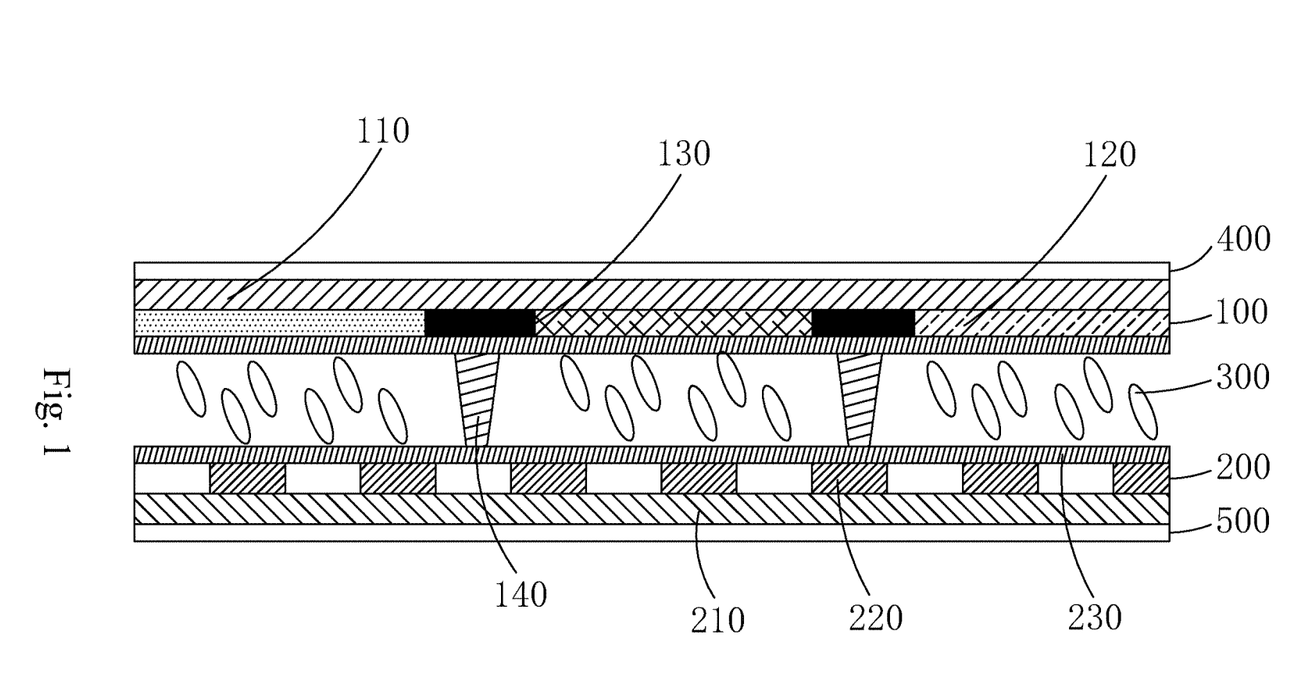
FIG. 1 is a sectional diagram of a liquid crystal display panel according to prior art.
Figure 2:
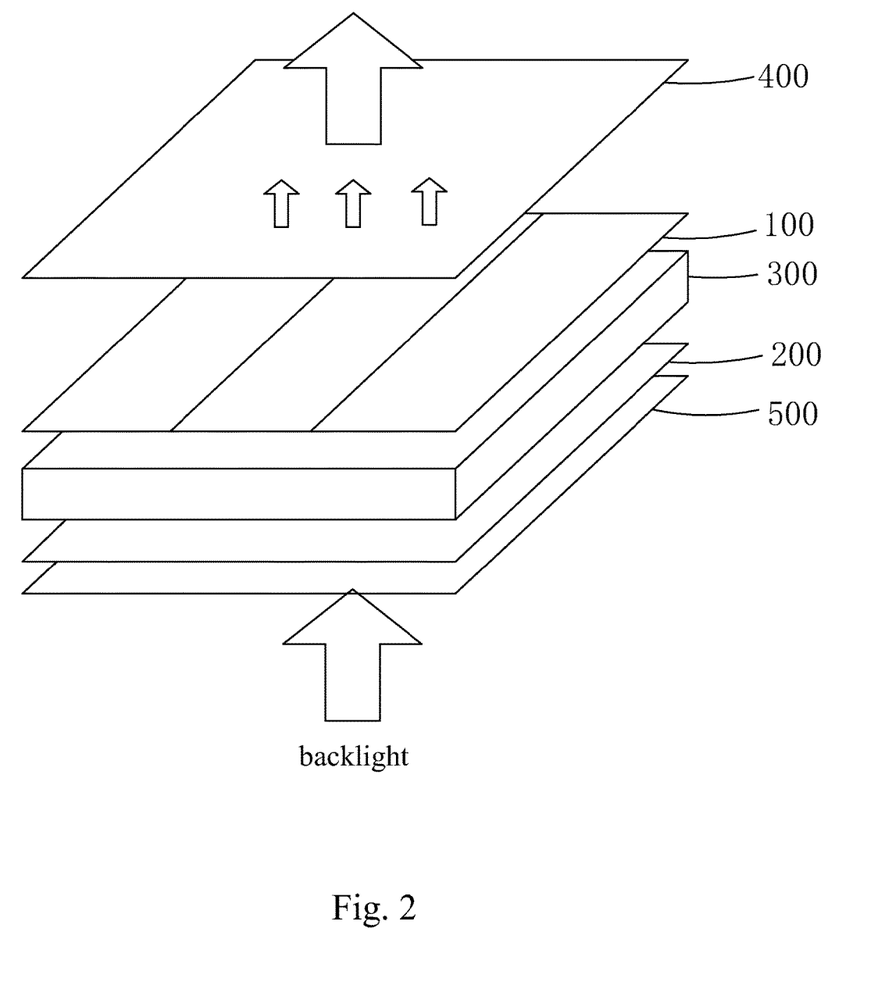
FIG. 2 is a solid exploded diagram of the liquid crystal display panel in FIG. 1.

FIG. 1 is a sectional diagram of a liquid crystal display panel according to prior art. FIG. 2 is a solid exploded diagram of the liquid crystal display panel in FIG. 1. As shown in FIG. 1 and FIG. 2, the liquid crystal display panel comprises a CF substrate 100, a TFT substrate 200 oppositely located to the CF substrate 100, a liquid crystal layer 300 located between the CF substrate 100 and the TFT substrate 200, an upper polarizer 400 located above the CF substrate 100, a lower polarizer 500 located under the TFT substrate 200 and a border adhesive (not shown) at a border position between the CF substrate 100 and the TFT substrate 200; the CF substrate 100 comprises a glass substrate 110, a color resist layer 120 and a black matrix 130 located on the glass substrate 110 and photospacers 140 being located above the black matrix 120 and corresponding to the black matrix 120; the TFT substrate 200 comprises a glass substrate 210, a TFT layer 220 located on the glass substrate 210 an alignment film 230 located on the TFT layer 220.

The working procedure of the liquid crystal display panel is to control the twists of the liquid crystal molecules in the pixel area with the voltages of the TFT substrate 200 and the CF substrate 100 for correspondingly changing the polarization state of the transmission light. In cooperation with the upper polarizer 400 and the lower polarizer 500 at two sides of the TFT substrate 200 and the CF substrate 100, the objective of controlling the transmission light volume can be achieved; the CF substrate 100 is to filter and absorb the light passing through the liquid crystal layer 300 to make that the light in each pixel area after exiting the liquid crystal display panel is constructed by three primary colors (or four colors).

However, the CF substrate 100 can only allow the light of partial wavelengths passing through, and the upper polarizer 400 is necessary to polarize the light. Thus, the intensity of the light passing through the CF substrate 100 will decay to be about 33% of the original intensity, which is one of the reasons why the LCD light efficiency is lower.

With the development of technology and the demands of the customers, high requirements is proposed to the light filtering ability of the color filter film for chasing the higher display quality. However, the color expression capability faces bigger restrictions because of the limitations of the frequency spectrum of the backlight source and the properties of the color resist material itself. The arisen organic light emitting material and quantum dot (QD) have great advantages in the light illumination aspect. According to the theory of the quantum restriction, the wavelength of the designated quantum dot is uniquely identified at the specific size, and the property of the structure determines that the frequency range of the emitting light is extremely narrow, and the full width at half maximum (FWHM) can reach up to 20 nm. By manipulating the synthesis dimension of the material, the emitting lights of RGB, three different frequency ranges can be obtained. By utilizing the excellent light emitting property of the quantum dot, the optimization to the emitting light spectrum can be realized to obtain high color gamut display and high color purity, which provide great helps for promoting the display performance.

SUMMARY OF THE INVENTION

An objective of the present invention is to provide a liquid crystal display device, of which the structure of the liquid crystal display panel is simple, and in comparison with the traditional liquid crystal display panel, the liquid crystal display panel of the present invention eliminates the components, such as the color resist layer and the upper polarizer. The structure is simple, and the manufacture cost is low. Meanwhile, the color display quality of the liquid crystal display panel is great, and the light transmission ratio is high, which effectively promote the light use efficiency and the display performance of the liquid crystal display device.

For realizing the aforesaid objective, the present invention provides a liquid crystal display device, comprising a liquid crystal display panel and a backlight source;

the liquid crystal display panel comprises an upper substrate, a lower substrate oppositely located to the upper substrate, a polarizer located under the lower substrate and a border adhesive at a border position between the upper substrate and the lower substrate;

the upper substrate comprises a first transparent substrate, a black matrix located on the first transparent substrate and a color resist wall, being located above the black matrix and corresponding to the black matrix;

the black matrix comprises a plurality of horizontal light shielding strips and a plurality of vertical light shielding strips crosswise arranged with the plurality of horizontal light shielding strips; the color resist wall comprises two horizontal color resist walls respectively corresponding to the two horizontal light shielding strips at outermost sides, and a plurality of vertical color resist walls respectively corresponding to the plurality of vertical light shielding strips, and the two horizontal color resist walls and the plurality of vertical color resist walls surround to form a plurality of strip grooves on the first transparent substrate;

the plurality of strip grooves comprise a red strip groove, a green strip groove and a blue strip groove; different mixed liquid crystal materials are respectively located in the red strip groove, the green strip groove and the blue strip groove, and respectively emit red, green, blue lights under illumination of the backlight source;

the lower substrate comprises a second transparent substrate, a TFT layer located on the second transparent substrate and an alignment film located on the TFT layer.

As the backlight source is a bluish violet LED lamp or a laser light source, the mixed liquid crystal material in the red strip groove is a mixture of liquid crystal, dichroic dye and red quantum dot, and the mixed liquid crystal material in the green strip groove is a mixture of liquid crystal, dichroic dye and green quantum dot, and the mixed liquid crystal material in the blue strip groove is a mixture of liquid crystal, dichroic dye and blue quantum dot; the red quantum dot in the red strip groove, the green quantum dot in the green strip groove and the blue quantum dot in the blue strip groove respectively emit red, green, blue lights under illumination of bluish violet light or laser light.

As the backlight source is a blue LED lamp, the mixed liquid crystal material in the red strip groove is a mixture of liquid crystal, dichroic dye and red quantum dot, and the mixed liquid crystal material in the green strip groove is a mixture of liquid crystal, dichroic dye and green quantum dot, and the mixed liquid crystal material in the blue strip groove is a mixture of liquid crystal and dichroic dye; the red quantum dot in the red strip groove and the green quantum dot in the green strip groove respectively emit red, green lights under illumination of blue light; no quantum dot is located in the blue strip groove, and the blue light permeates to emit the blue light.

As the liquid crystal display panel is a VA type liquid crystal display panel, the upper substrate further comprises a common electrode layer between the first transparent substrate and the black matrix; the lower substrate further comprises a pixel electrode layer located between the TFT layer and the alignment film.

Alignment films are located at bottoms of the strip grooves of the upper substrate.

As the liquid crystal display panel is an IPS or FFS type liquid crystal display panel, the lower substrate further comprises a pixel electrode layer and a common electrode layer between the TFT layer and the alignment film, and the upper substrate further comprises an alignment film located on the first transparent substrate.

All the mixed liquid crystal materials in the red strip groove, the green strip groove and the blue strip groove are uniformly mixed with a physical method.

The dichroic dye is azobenzene or anthraquinone.

As the liquid crystal display panel is a VA type liquid crystal display panel, a transmission axis direction of the polarizer is parallel with an alignment direction when liquid crystal molecules are provided with voltage.

As the liquid crystal display panel is an IPS or FFS type liquid crystal display panel, a transmission axis direction of the polarizer is parallel with or perpendicular to a horizontal alignment direction when liquid crystal molecules are not provided with voltage.

The present invention further provides a liquid crystal display device, comprising a liquid crystal display panel and a backlight source;

the liquid crystal display panel comprises an upper substrate, a lower substrate oppositely located to the upper substrate, a polarizer located under the lower substrate and a border adhesive at a border position between the upper substrate and the lower substrate;

the upper substrate comprises a first transparent substrate, a black matrix located on the first transparent substrate and a color resist wall, being located above the black matrix and corresponding to the black matrix;

the black matrix comprises a plurality of horizontal light shielding strips and a plurality of vertical light shielding strips crosswise arranged with the plurality of horizontal light shielding strips; the color resist wall comprises two horizontal color resist walls respectively corresponding to the two horizontal light shielding strips at outermost sides, and a plurality of vertical color resist walls respectively corresponding to the plurality of vertical light shielding strips, and the two horizontal color resist walls and the plurality of vertical color resist walls surround to form a plurality of strip grooves on the first transparent substrate;

the plurality of strip grooves comprise a red strip groove, a green strip groove and a blue strip groove; different mixed liquid crystal materials are respectively located in the red strip groove, the green strip groove and the blue strip groove, and respectively emit red, green, blue lights under illumination of the backlight source;

the lower substrate comprises a second transparent substrate, a TFT layer located on the second transparent substrate and an alignment film located on the TFT layer;

wherein as the backlight source is a bluish violet LED lamp or a laser light source, the mixed liquid crystal material in the red strip groove is a mixture of liquid crystal, dichroic dye and red quantum dot, and the mixed liquid crystal material in the green strip groove is a mixture of liquid crystal, dichroic dye and green quantum dot, and the mixed liquid crystal material in the blue strip groove is a mixture of liquid crystal, dichroic dye and blue quantum dot; the red quantum dot in the red strip groove, the green quantum dot in the green strip groove and the blue quantum dot in the blue strip groove respectively emit red, green, blue lights under illumination of bluish violet light or laser light;

wherein as the backlight source is a blue LED lamp, the mixed liquid crystal material in the red strip groove is a mixture of liquid crystal, dichroic dye and red quantum dot, and the mixed liquid crystal material in the green strip groove is a mixture of liquid crystal, dichroic dye and green quantum dot, and the mixed liquid crystal material in the blue strip groove is a mixture of liquid crystal and dichroic dye; the red quantum dot in the red strip groove and the green quantum dot in the green strip groove respectively emit red, green lights under illumination of blue light; no quantum dot is located in the blue strip groove, and the blue light permeates to emit the blue light;

wherein all the mixed liquid crystal materials in the red strip groove, the green strip groove and the blue strip groove are uniformly mixed with a physical method;

wherein the dichroic dye is azobenzene or anthraquinone.

The benefits of the present invention are: the present invention provides a liquid crystal display device. By mixing the quantum dots of different light emitting wavelengths in the liquid crystals to replace the color resist layer on the CF substrate, the liquid crystal display panel still can emit lights of RGB three colors in condition of without the color resist layer. Meanwhile, by mixing the dichroic dye with polarization function in the liquid crystals, the arrangement of one polarizer can be eliminated. In comparison with the traditional liquid crystal display panel, the liquid crystal display panel of the present invention eliminates the components, such as the color resist layer and the upper polarizer. The structure is simple, and the manufacture cost is low. Meanwhile, the color display quality of the liquid crystal display panel is great, and the light transmission ratio is high, which effectively promote the light use efficiency and the display performance of the liquid crystal display device.

BRIEF DESCRIPTION OF THE DRAWINGS

The technical solution and the beneficial effects of the present invention are best understood from the following detailed description with reference to the accompanying figures and embodiments.

In drawings.

DETAILED DESCRIPTION OF PREFERRED EMBODIMENTS

For better explaining the technical solution and the effect of the present invention, the present invention will be further described in detail with the accompanying drawings and the specific embodiments.

Figure 3:
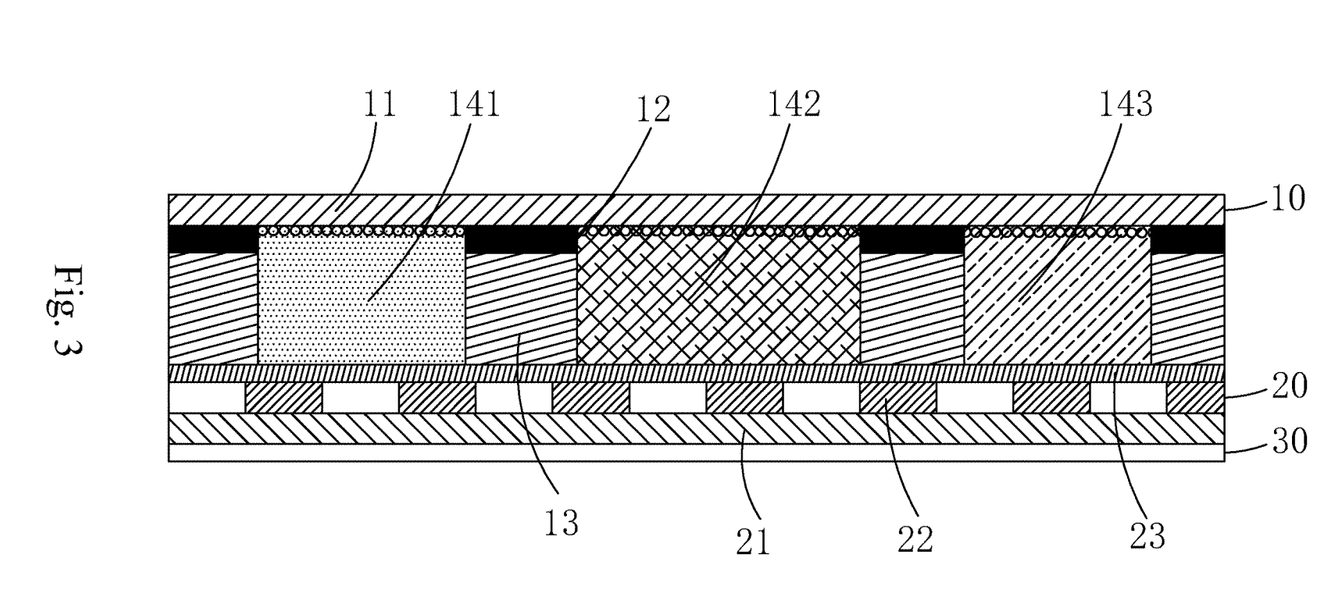
FIG. 3 is a sectional diagram of a liquid crystal display panel in a liquid crystal display device according to the present invention.
Figure 4:
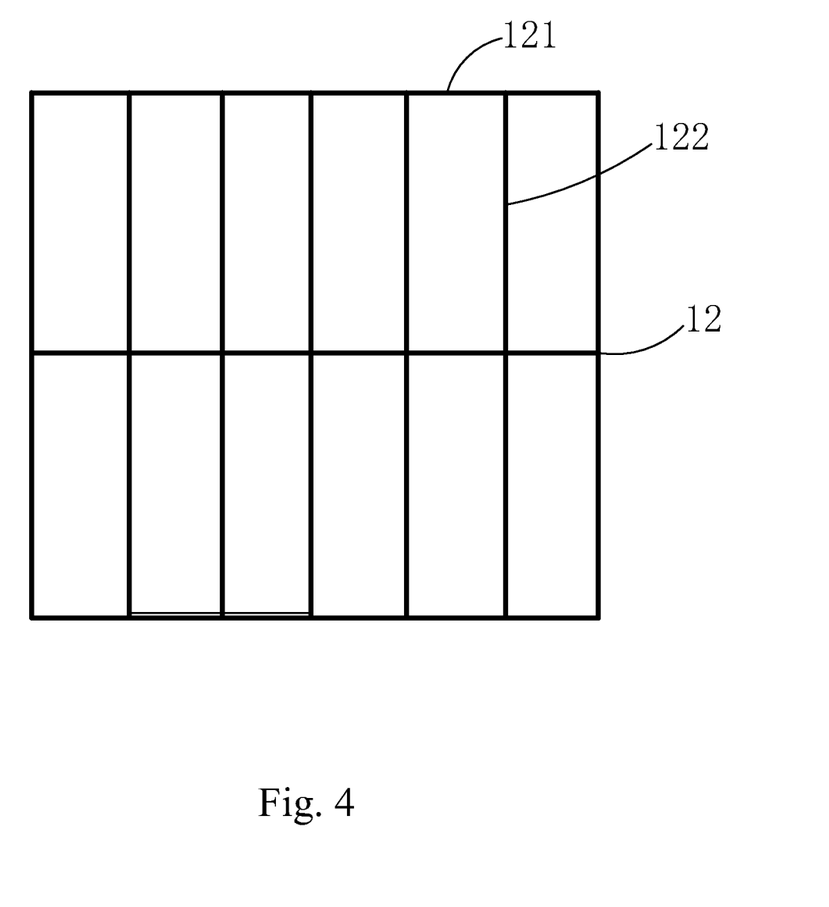
FIG. 4 is a structure diagram of a black matrix in the liquid crystal display panel in FIG. 3.
Figure 5:
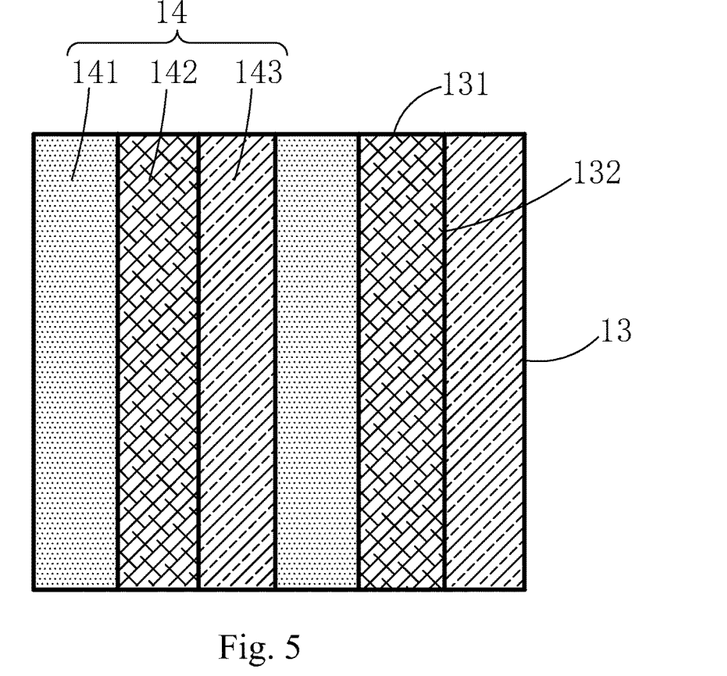
FIG. 5 is a structure diagram of a color resist wall in the liquid crystal display panel in FIG. 3.

Please refer from FIG. 3 to FIG. 5. The present invention provides a liquid crystal display device, comprising a liquid crystal display panel and a backlight source;

the liquid crystal display panel comprises an upper substrate 10, a lower substrate 20 oppositely located to the upper substrate 10, a polarizer 30 located under the lower substrate 20 and a border adhesive (not shown) at a border position between the upper substrate 10 and the lower substrate 20;

the upper substrate 10 comprises a first transparent substrate 11, a black matrix 12 located on the first transparent substrate 11 and a color resist wall 13, being located above the black matrix 12 and corresponding to the black matrix 12;

specifically, as shown in FIG. 4, the black matrix 12 comprises a plurality of horizontal light shielding strips 121 and a plurality of vertical light shielding strips 122 crosswise arranged with the plurality of horizontal light shielding strips 121; as shown in FIG. 5, the color resist wall 13 comprises two horizontal color resist walls 131 respectively corresponding to the two horizontal light shielding strips 121 at outermost sides, and a plurality of vertical color resist walls 132 respectively corresponding to the plurality of vertical light shielding strips 122, and the two horizontal color resist walls 131 and the plurality of vertical color resist walls 132 surround to form a plurality of strip grooves 4 on the first transparent substrate 11.

Specifically, the plurality of strip grooves 14 comprise a red strip groove 141, a green strip groove 142 and a blue strip groove 143; different mixed liquid crystal materials are respectively located in the red strip groove 141, the green strip groove 142 and the blue strip groove 143, and respectively emit red, green, blue lights under illumination of the backlight source.

Specifically, a height of the color resist wall 13 is determined according to the cell gap of the liquid crystal display panel. The manufacture conditions and corresponding materials are similar with the photospacers in prior art.

The lower substrate 20 comprises a second transparent substrate 21, a TFT layer 22 located on the second transparent substrate 21 and an alignment film 23 located on the TFT layer 22.

Preferably, both the first transparent substrate 11 in the upper substrate 10 and the second transparent substrate 21 in the lower substrate 20 are glass substrates.

Specifically, as the backlight source is a bluish violet LED lamp or a laser light source, the mixed liquid crystal material in the red strip groove 141 is a mixture of liquid crystal, dichroic dye and red quantum dot, and the mixed liquid crystal material in the green strip groove 142 is a mixture of liquid crystal, dichroic dye and green quantum dot, and the mixed liquid crystal material in the blue strip groove 143 is a mixture of liquid crystal, dichroic dye and blue quantum dot; the red quantum dot in the red strip groove 141, the green quantum dot in the green strip groove 142 and the blue quantum dot in the blue strip groove 143 respectively emit red, green, blue lights under illumination of bluish violet light or laser light.

Specifically, as the backlight source is a blue LED lamp, the mixed liquid crystal material in the red strip groove 141 is a mixture of liquid crystal, dichroic dye and red quantum dot, and the mixed liquid crystal material in the green strip groove 142 is a mixture of liquid crystal, dichroic dye and green quantum dot, and the mixed liquid crystal material in the blue strip groove 143 is a mixture of liquid crystal and dichroic dye; the red quantum dot in the red strip groove 141 and the green quantum dot in the green strip groove 142 respectively emit red, green lights under illumination of blue light; no quantum dot is located in the blue strip groove 143, and the blue light permeates to emit the blue light.

Specifically, all the mixed liquid crystal materials in the red strip groove 141, the green strip groove 142 and the blue strip groove 143 are uniformly mixed with a physical method. For instance, a blender is used to implement mechanical agitation or sonic oscillation is used for mixture.

Specifically, for the condition that the mixed liquid crystal material is the mixture of liquid crystal, dichroic dye and quantum dot, the quantum dot will separate from the liquid crystal and dichroic dye and attaches at the bottom of the strip grooves 14. After the mixed liquid crystal material is injected in the strip grooves 14. After the light passes through the liquid crystal and dichroic dye, it will be converted by the quantum dot to be lights of RGB three colors for replacing the function of the RGB color resists. The self aggregation behavior of the quantum dots will generates the similar function like the alignment film. The formed chain structure makes the liquid crystals generate the alignment force, which can replace the alignment function of the alignment film.

Specifically, the dichroic dye is azobenzene or anthraquinone.

Specifically, the red, green, blue quantum dots utilized in the present invention are semiconductor nanocrystalline quantum dots or other nanoparticles of photoluminescence.

Specifically, as the liquid crystal display panel is a VA (Vertical Alignment) type liquid crystal display panel, the upper substrate 10 further comprises a common electrode layer between the first transparent substrate 11 and the black matrix 12; the lower substrate 20 further comprises a pixel electrode layer located between the TFT layer 22 and the alignment film 23. Besides, as regarding the VA mode, the self aggregation effect of the quantum dots can generates alignment function to the liquid crystals. Thus, no alignment film is required in the upper substrate 10 but the alignment to the liquid crystals can be implemented merely by the self aggregation effect of the quantum dots. The alignment film can be further located at the bottom of the strip grooves 14 of the upper substrate 10 for promoting the alignment result in advance.

Specifically, as the liquid crystal display panel is an IPS (In-Plane Switching) or FFS (Fringe Field Switching) type liquid crystal display panel, the lower substrate 20 further comprises a pixel electrode layer and a common electrode layer between the TFT layer 22 and the alignment film 23, and the upper substrate 10 further comprises an alignment film located on the first transparent substrate 11.

Figure 6:
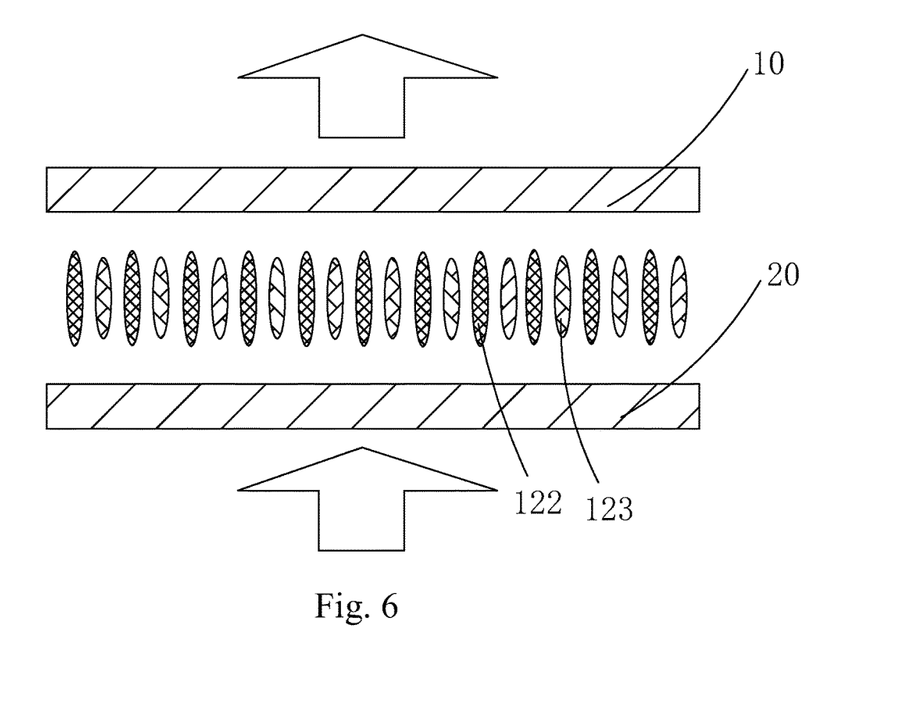
FIG. 6 is a diagram of adjustment of dichroic dye to an incident light when dichroic dye molecules are in vertical state along with liquid crystal molecules.
Figure 7:
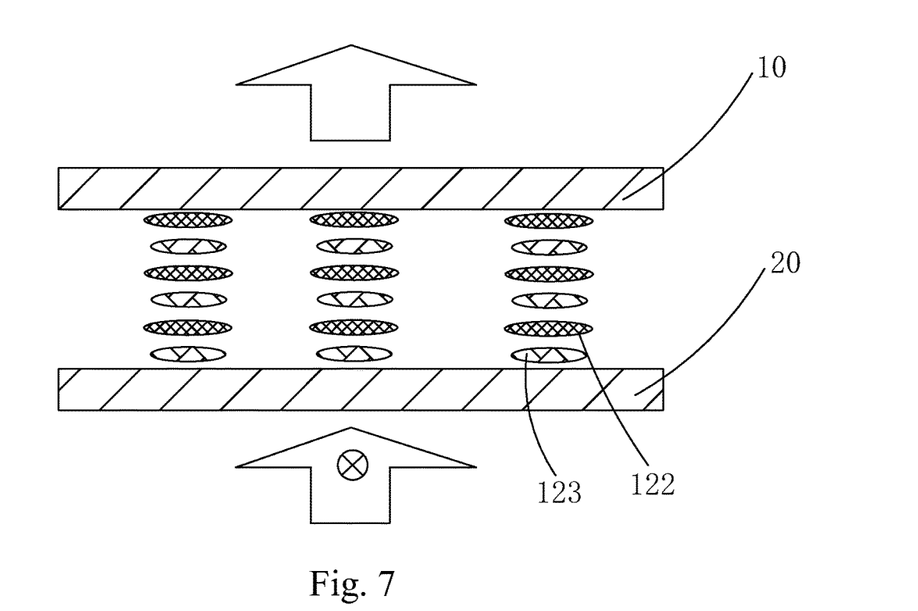
FIG. 7 is a diagram of adjustment of dichroic dye to an incident light when a polarization direction of the incident light is perpendicular to an absorption axis of dichroic dye molecules.
Figure 8:
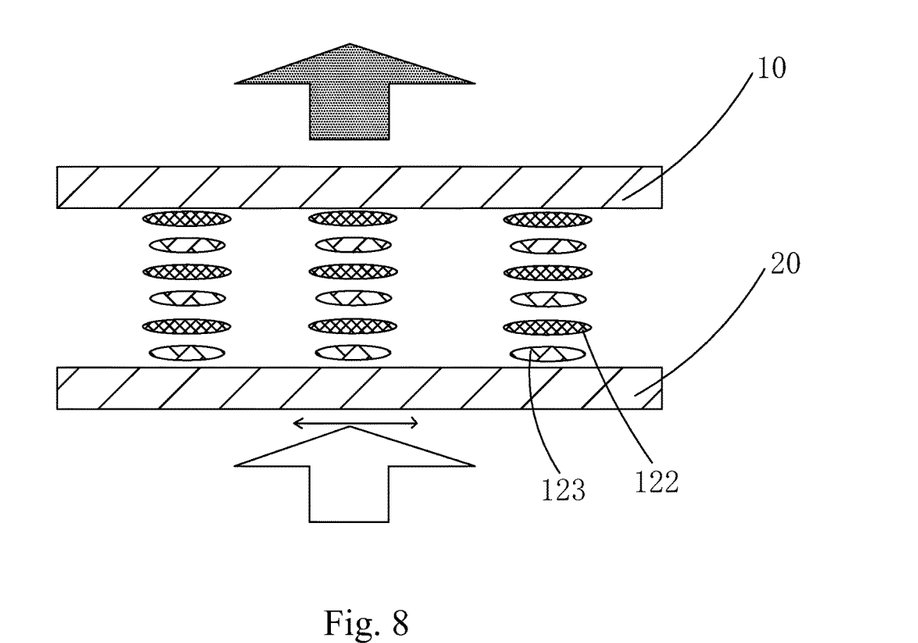
FIG. 8 is a diagram of adjustment of dichroic dye to an incident light when a polarization direction of the incident light is parallel with an absorption axis of dichroic dye molecules.

The dichroic dye used in the present invention possesses polarization function. After the dichroic dye and the liquid crystals are mixed, the dichroic dye rotates along with the rotation of the liquid crystal molecules under the function of the electrical field to be consistent with the orientation of the liquid crystal molecules. Specifically, the working principle of the dichroic dye in the liquid crystals is below:

Please refer to FIG. 6. When the incident light has no particular polarization direction, and the liquid crystal molecules 122 and the dichroic dye molecules 123 are vertically aligned with the upper substrate 10 and the lower substrate 20. Then, the absorption function of the dichroic dye molecules 123 to the light is the weakest. Almost all lights pass through the liquid crystal layer;

Please refer to FIG. 7. The cross in figure represents that the polarization direction of the incident light is perpendicular to the paper surface, and when the polarization direction of the incident light is perpendicular to the paper surface, and the liquid crystal molecules 122 and the dichroic dye molecules 123 are aligned in parallel with the upper substrate 10 and the lower substrate 20, the polarization direction of the incident light is perpendicular to the absorption axis of the dichroic dye molecules 123. Then, the absorption function of the dichroic dye molecules 123 to the light is the weakest. Almost all lights pass through the liquid crystal layer;

Please refer to FIG. 8. The black double arrow in figure represents that the polarization direction of the incident light is parallel with the paper surface, and when the polarization direction of the incident light is parallel with the paper surface, and the liquid crystal molecules 122 and the dichroic dye molecules 123 are aligned in parallel with the upper substrate 10 and the lower substrate 20, the polarization direction of the incident light is parallel with the absorption axis of the dichroic dye molecules 123. Then, the absorption function of the dichroic dye molecules 123 to the light is the strongest. Almost all lights are absorbed by the dichroic dye molecules 123. The intensity of the light finally passing through the liquid crystal layer is zero.

According to the aforesaid principle, only one sheet of polarizer 30 can achieve the control of the light intensity in the liquid crystal display panel structure according to the present invention. Specifically, the polarizer 30 is located at one side of the lower substrate 20 away from the upper substrate 10. Specifically, the light transmission axis of the polarizer 30 is set in accordance with different liquid crystal display modes.

Figure 9:
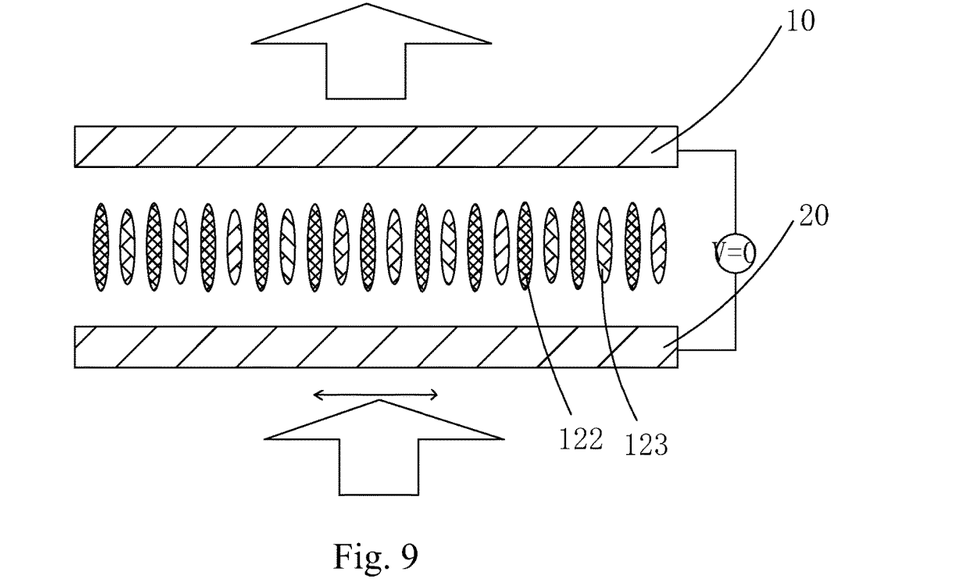
FIG. 9 is a diagram of adjustment of dichroic dye to an incident light when two sides of a liquid crystal layer are not applied with voltages in the VA type display mode.

As the liquid crystal display panel of the present invention is a VA type liquid crystal display panel, a transmission axis direction of the polarizer 30 is set to be parallel with an alignment direction when liquid crystal molecules are provided with voltage;

as shown in FIG. 9, when two sides of a liquid crystal layer are not applied with voltages, and the liquid crystal molecules 122 and the dichroic dye molecules 123 are aligned perpendicular to the upper substrate 10 and the lower substrate 20, the polarization direction of the incident light is perpendicular to the absorption axis of the dichroic dye molecules 123. Then, the absorption function of the dichroic dye molecules 123 to the light is the weakest. Almost all lights pass through the liquid crystal layer, and the liquid crystal display panel is in a bright state.

Figure 10:
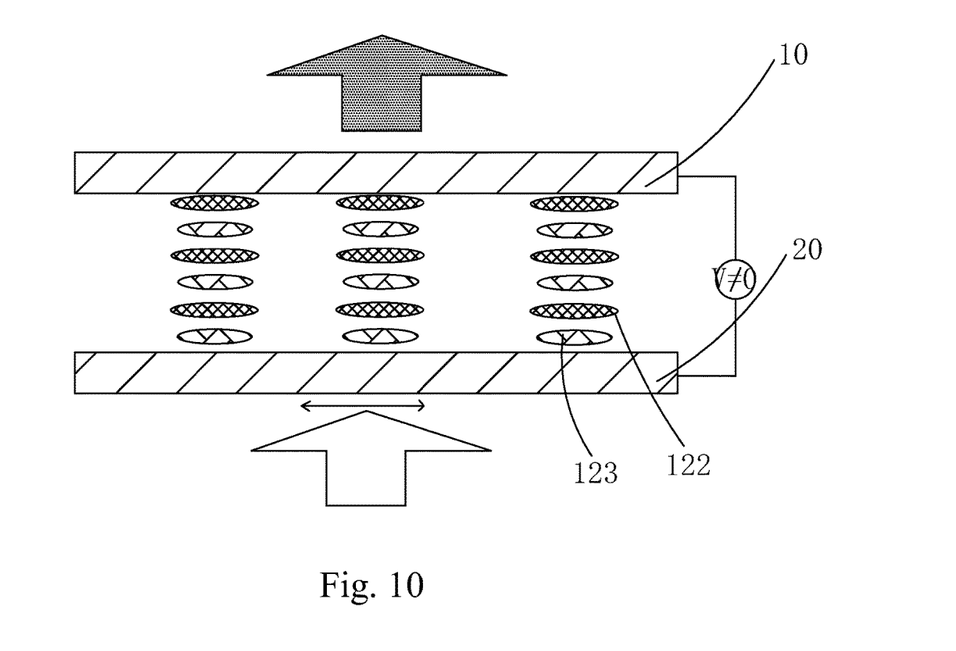
FIG. 10 is a diagram of adjustment of dichroic dye to an incident light when two sides of a liquid crystal layer are applied with voltages in the VA type display mode.

As shown in FIG. 10, after the two sides of a liquid crystal layer are applied with voltages, and the liquid crystal molecules 122 and the dichroic dye molecules 123 are aligned in parallel with the upper substrate 10 and the lower substrate 20, the polarization direction of the incident light is in parallel with the absorption axis of the dichroic dye molecules 123. Then, the absorption function of the dichroic dye molecules 123 to the light is the strongest. Almost all lights are absorbed by the dichroic dye molecules 123. The intensity of the light finally passing through the liquid crystal layer is zero, and the liquid crystal display panel is in a dark state.

Figure 11:
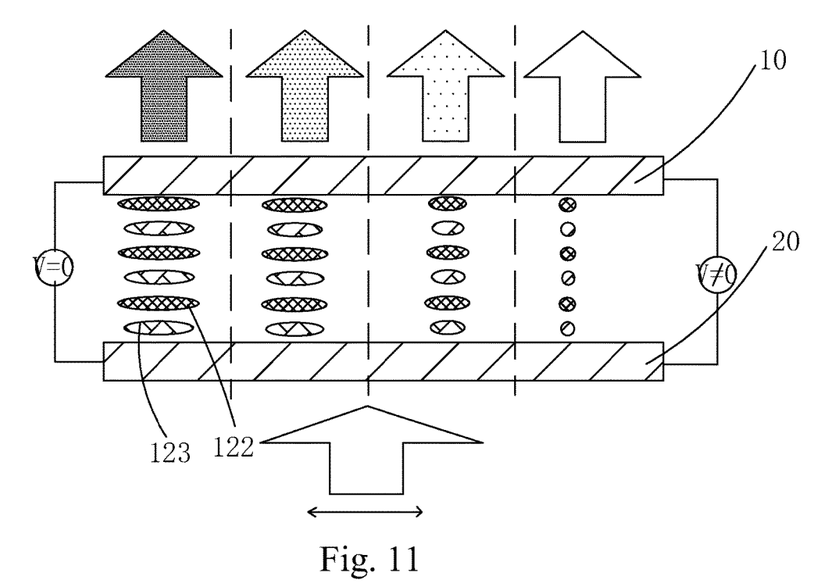
FIG. 11 is a diagram of adjustment of dichroic dye to an incident light when a transmission axis direction of the polarizer is parallel with a horizontal alignment direction when liquid crystal molecules are not provided with voltage in the IPS/FFS display mode.
Figure 12:
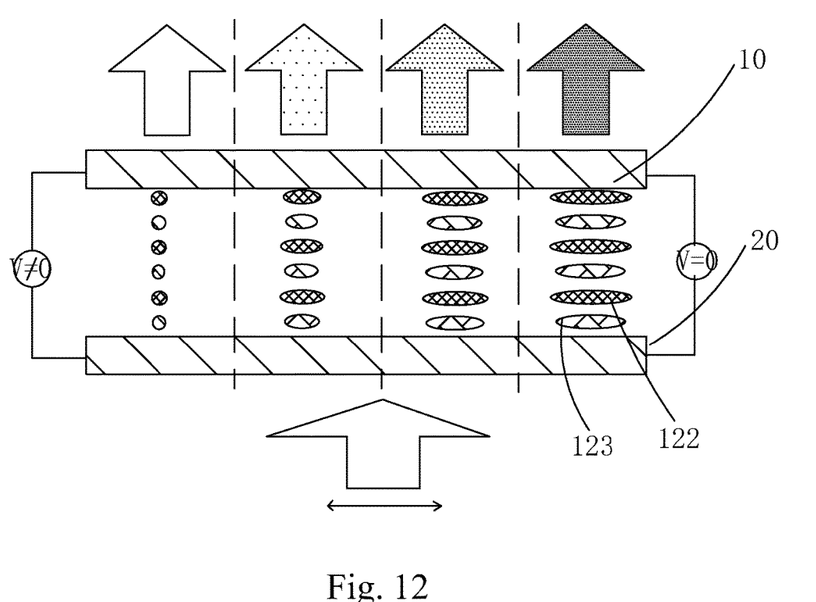
FIG. 12 is a diagram of adjustment of dichroic dye to an incident light when a transmission axis direction of the polarizer is perpendicular to a horizontal alignment direction when liquid crystal molecules are not provided with voltage in the IPS/FFS display mode.

As the liquid crystal display panel is an IPS or FFS type liquid crystal display panel, a transmission axis direction of the polarizer 30 is set to be parallel with or perpendicular to a horizontal alignment direction when liquid crystal molecules are not provided with voltage;

As shown in FIG. 11, as the transmission axis direction of the polarizer 30 is parallel with the horizontal alignment direction when the liquid crystal molecules are not provided with voltages, and the liquid crystal layer is not provided with voltages, the absorption axis of the dichroic dye molecules 123 is in parallel with the polarization direction of the incident light, and the absorption function of the dichroic dye molecules 123 to the light is the strongest. The intensity of the light finally passing through the liquid crystal layer is zero, and the liquid crystal display panel is in a dark state; after applying voltages to the liquid crystal layer, the liquid crystal molecules and the dichroic dye molecules 123 are gradually twisted under the function of the electrical field with the increase of the voltages. Along with that the included angle between the absorption axis of the dichroic dye molecules 123 and polarization direction of the incident light gradually gets close to 90°, the absorption function of the dichroic dye molecules 123 to the light fades away. When the absorption axis of the dichroic dye molecules 123 and the polarization direction of the incident light are perpendicular, the absorption function of the dichroic dye molecules 123 to the light is the weakest, and the liquid crystal display panel is in a bright state;

As shown in FIG. 12, as the transmission axis direction of the polarizer 30 is perpendicular to the horizontal alignment direction when the liquid crystal molecules are not provided with voltages, and the liquid crystal layer is not provided with voltages, the absorption axis of the dichroic dye molecules 123 is perpendicular to the polarization direction of the incident light, and the absorption function of the dichroic dye molecules 123 to the light is the weakest. Almost all lights pass through the liquid crystal layer, and the liquid crystal display panel is in a bright state; after applying voltages to the liquid crystal layer, the liquid crystal molecules and the dichroic dye molecules 123 are gradually twisted under the function of the electrical field. Along with that the absorption axis of the dichroic dye molecules 123 and polarization direction of the incident light gradually become parallel, the absorption function of the dichroic dye molecules 123 to the light gradually gets stronger. When the absorption axis of the dichroic dye molecules 123 and the polarization direction of the incident light are parallel, the absorption function of the dichroic dye molecules 123 to the light is the strongest, and the liquid crystal display panel is in a dark state.

In conclusion, the present invention provides a liquid crystal display device. By mixing the quantum dots of different light emitting wavelengths in the liquid crystals to replace the color resist layer on the CF substrate, the liquid crystal display panel still can emit lights of RGB three colors in condition of without the color resist layer. Meanwhile, by mixing the dichroic dye with polarization function in the liquid crystals, the arrangement of one polarizer can be eliminated. In comparison with the traditional liquid crystal display panel, the liquid crystal display panel of the present invention eliminates the components, such as the color resist layer and the upper polarizer. The structure is simple, and the manufacture cost is low. Meanwhile, the color display quality of the liquid crystal display panel is great, and the light transmission ratio is high, which effectively promote the light use efficiency and the display performance of the liquid crystal display device.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A liquid crystal display device, comprising a liquid crystal display panel and a backlight source;
the liquid crystal display panel comprises an upper substrate, a lower substrate oppositely located to the upper substrate, a polarizer located under the lower substrate and a border adhesive at a border position between the upper substrate and the lower substrate;
the upper substrate comprises a first transparent substrate, a black matrix located on the first transparent substrate and a color resist wall, being located above the black matrix and corresponding to the black matrix;
the black matrix comprises a plurality of horizontal light shielding strips and a plurality of vertical light shielding strips crosswise arranged with the plurality of horizontal light shielding strips; the color resist wall comprises two horizontal color resist walls respectively corresponding to the two horizontal light shielding strips at outermost sides, and a plurality of vertical color resist walls respectively corresponding to the plurality of vertical light shielding strips, and the two horizontal color resist walls and the plurality of vertical color resist walls surround to form a plurality of strip grooves on the first transparent substrate;
the plurality of strip grooves comprise a red strip groove, a green strip groove and a blue strip groove; different mixed liquid crystal materials are respectively located in the red strip groove, the green strip groove and the blue strip groove, and respectively emit red, green, blue lights under illumination of the backlight source;
the lower substrate comprises a second transparent substrate, a TFT layer located on the second transparent substrate and an alignment film located on the TFT layer.

2. The liquid crystal display device according to claim 1, wherein as the backlight source is a bluish violet LED lamp or a laser light source, the mixed liquid crystal material in the red strip groove is a mixture of liquid crystal, dichroic dye and red quantum dot, and the mixed liquid crystal material in the green strip groove is a mixture of liquid crystal, dichroic dye and green quantum dot, and the mixed liquid crystal material in the blue strip groove is a mixture of liquid crystal, dichroic dye and blue quantum dot; the red quantum dot in the red strip groove, the green quantum dot in the green strip groove and the blue quantum dot in the blue strip groove respectively emit red, green, blue lights under illumination of bluish violet light or laser light.

3. The liquid crystal display device according to claim 1, wherein as the backlight source is a blue LED lamp, the mixed liquid crystal material in the red strip groove is a mixture of liquid crystal, dichroic dye and red quantum dot, and the mixed liquid crystal material in the green strip groove is a mixture of liquid crystal, dichroic dye and green quantum dot, and the mixed liquid crystal material in the blue strip groove is a mixture of liquid crystal and dichroic dye; the red quantum dot in the red strip groove and the green quantum dot in the green strip groove respectively emit red, green lights under illumination of blue light; no quantum dot is located in the blue strip groove, and the blue light permeates to emit the blue light.

4. The liquid crystal display device according to claim 1, wherein as the liquid crystal display panel is a VA type liquid crystal display panel, the upper substrate further comprises a common electrode layer between the first transparent substrate and the black matrix; the lower substrate further comprises a pixel electrode layer located between the TFT layer and the alignment film.

5. The liquid crystal display device according to claim 4, wherein alignment films are located at bottoms of the strip grooves of the upper substrate.

6. The liquid crystal display device according to claim 1, wherein as the liquid crystal display panel is an IPS or FFS type liquid crystal display panel, the lower substrate further comprises a pixel electrode layer and a common electrode layer between the TFT layer and the alignment film, and the upper substrate further comprises an alignment film located on the first transparent substrate.

7. The liquid crystal display device according to claim 2, wherein all the mixed liquid crystal materials in the red strip groove, the green strip groove and the blue strip groove are uniformly mixed with a physical method.

8. The liquid crystal display device according to claim 3, wherein all the mixed liquid crystal materials in the red strip groove, the green strip groove and the blue strip groove are uniformly mixed with a physical method.

9. The liquid crystal display device according to claim 2, wherein the dichroic dye is azobenzene or anthraquinone.

10. The liquid crystal display device according to claim 3, wherein the dichroic dye is azobenzene or anthraquinone.

11. The liquid crystal display device according to claim 1, wherein as the liquid crystal display panel is a VA type liquid crystal display panel, a transmission axis direction of the polarizer is parallel with an alignment direction when liquid crystal molecules are provided with voltage.

12. The liquid crystal display device according to claim 1, wherein as the liquid crystal display panel is an IPS or FFS type liquid crystal display panel, a transmission axis direction of the polarizer is parallel with or perpendicular to a horizontal alignment direction when liquid crystal molecules are not provided with voltage.

13. A liquid crystal display device, comprising a liquid crystal display panel and a backlight source;
   the liquid crystal display panel comprises an upper substrate, a lower substrate oppositely located to the upper substrate, a polarizer located under the lower substrate and a border adhesive at a border position between the upper substrate and the lower substrate;
   the upper substrate comprises a first transparent substrate, a black matrix located on the first transparent substrate and a color resist wall, being located above the black matrix and corresponding to the black matrix;
   the black matrix comprises a plurality of horizontal light shielding strips and a plurality of vertical light shielding strips crosswise arranged with the plurality of horizontal light shielding strips; the color resist wall comprises two horizontal color resist walls respectively corresponding to the two horizontal light shielding strips at outermost sides, and a plurality of vertical color resist walls respectively corresponding to the plurality of vertical light shielding strips, and the two horizontal color resist walls and the plurality of vertical color resist walls surround to form a plurality of strip grooves on the first transparent substrate;
   the plurality of strip grooves comprise a red strip groove, a green strip groove and a blue strip groove; different mixed liquid crystal materials are respectively located in the red strip groove, the green strip groove and the blue strip groove, and respectively emit red, green, blue lights under illumination of the backlight source;
   the lower substrate comprises a second transparent substrate, a TFT layer located on the second transparent substrate and an alignment film located on the TFT layer;
   wherein as the backlight source is a bluish violet LED lamp or a laser light source, the mixed liquid crystal material in the red strip groove is a mixture of liquid crystal, dichroic dye and red quantum dot, and the mixed liquid crystal material in the green strip groove is a mixture of liquid crystal, dichroic dye and green quantum dot, and the mixed liquid crystal material in the blue strip groove is a mixture of liquid crystal, dichroic dye and blue quantum dot; the red quantum dot in the red strip groove, the green quantum dot in the green strip groove and the blue quantum dot in the blue strip groove respectively emit red, green, blue lights under illumination of bluish violet light or laser light;
   wherein as the backlight source is a blue LED lamp, the mixed liquid crystal material in the red strip groove is a mixture of liquid crystal, dichroic dye and red quantum dot, and the mixed liquid crystal material in the green strip groove is a mixture of liquid crystal, dichroic dye and green quantum dot, and the mixed liquid crystal material in the blue strip groove is a mixture of liquid crystal and dichroic dye;
   the red quantum dot in the red strip groove and the green quantum dot in the green strip groove respectively emit red, green lights under illumination of blue light; no quantum dot is located in the blue strip groove, and the blue light permeates to emit the blue light;
   wherein all the mixed liquid crystal materials in the red strip groove, the green strip groove and the blue strip groove are uniformly mixed with a physical method;
   wherein the dichroic dye is azobenzene or anthraquinone.

14. The liquid crystal display device according to claim 13, wherein as the liquid crystal display panel is a VA type liquid crystal display panel, the upper substrate further comprises a common electrode layer between the first transparent substrate and the black matrix; the lower substrate further comprises a pixel electrode layer located between the TFT layer and the alignment film.

15. The liquid crystal display device according to claim 14, wherein alignment films are located at bottoms of the strip grooves of the upper substrate.

16. The liquid crystal display device according to claim 13, wherein as the liquid crystal display panel is an IPS or FFS type liquid crystal display panel, the lower substrate further comprises a pixel electrode layer and a common electrode layer between the TFT layer and the alignment film, and the upper substrate further comprises an alignment film located on the first transparent substrate.

17. The liquid crystal display device according to claim 13, wherein as the liquid crystal display panel is a VA type liquid crystal display panel, a transmission axis direction of the polarizer is parallel with an alignment direction when liquid crystal molecules are provided with voltage.

18. The liquid crystal display device according to claim 13, wherein as the liquid crystal display panel is an IPS or FFS type liquid crystal display panel, a transmission axis direction of the polarizer is parallel with or perpendicular to a horizontal alignment direction when liquid crystal molecules are not provided with voltage.

* * * * *